United States Patent
Das et al.

(10) Patent No.: US 8,139,722 B2
(45) Date of Patent: Mar. 20, 2012

(54) SYSTEM AND METHOD FOR EXPEDITED RESOLUTION OF INQUIRIES FOR AN AUTOMATED AGENT

(75) Inventors: Subrata K. Das, Granite Springs, NY (US); Ea-Ee Jan, Ardsley, NY (US)

(73) Assignee: International Business Machines Corporation, Armonk, NY (US)

( * ) Notice: Subject to any disclaimer, the term of this patent is extended or adjusted under 35 U.S.C. 154(b) by 539 days.

(21) Appl. No.: 12/132,000

(22) Filed: Jun. 3, 2008

(65) Prior Publication Data

US 2008/0226058 A1 Sep. 18, 2008

Related U.S. Application Data

(63) Continuation of application No. 11/106,215, filed on Apr. 14, 2005, now abandoned.

(51) Int. Cl.
 *H04M 1/64* (2006.01)

(52) U.S. Cl. ........................ 379/88.01; 455/563; 704/251

(58) Field of Classification Search .. 379/265.01–266.1, 379/88.01, 88.04; 455/563; 704/251
See application file for complete search history.

(56) References Cited

U.S. PATENT DOCUMENTS

| | | | |
|---|---|---|---|
| 5,774,525 A * | 6/1998 | Kanevsky et al. | 379/88.02 |
| 6,868,154 B1 | 3/2005 | Stuart et al. | |
| 7,110,949 B2 | 9/2006 | Bushey et al. | |
| 7,158,935 B1 | 1/2007 | Gorin et al. | |
| 2006/0018440 A1 | 1/2006 | Watkins et al. | |

* cited by examiner

*Primary Examiner* — Ahmad Matar
*Assistant Examiner* — Oleg Asanbayev
(74) *Attorney, Agent, or Firm* — Tutunjian & Bitetto, P.C.; Anne V. Dougherty

(57) ABSTRACT

An automated agent system and method includes an action classifier which scores a representation of a portion of a user inquiry based on a knowledge bank. A comparing device compares a running score of the representation to a threshold to determine if enough information has been collected to respond early to the inquiry. An action mechanism provides an early response to the user prior to the user completing the inquiry if the threshold has been exceeded.

19 Claims, 2 Drawing Sheets

SYSTEM AND METHOD FOR EXPEDITED RESOLUTION OF INQUIRIES FOR AN AUTOMATED AGENT

RELATED APPLICATION INFORMATION

This application is a Continuation application of U.S. patent application Ser. No. 11/106,215 filed Apr. 14, 2005 now abandoned, incorporated herein by reference in its entirety.

BACKGROUND

1. Technical Field

The present invention relates to an automated agent system and method and more particularly to a system and method, which expedites resolution of inquiries in an automated agent.

2. Description of the Related Art

A call center provides rapid resolution of a caller's inquiry. In a traditional call center manned by human agents, both the caller and the agent tend to barge in on each other during the course of a normal conversation; this may serve to speed up the process of problem resolution.

For example, the following exchange illustrates a call made to a call center. The caller had just installed a software package on his computer following the agent's instructions and inquired, "So I need to start the . . . ", but before the caller could finish the sentence, the agent barged in with the answer, "Yeah, you need to take out the CD first and then restart . . . " and so on, since the agent could guess what the caller was going to say and did not want to wait for the caller to finish saying the full sentence.

This type of barge-in by the agent and the caller helps to expedite the process of problem resolution in a traditional call center manned by human agents.

In an automated call center, barge-in by a caller is often permitted to speed up the process of problem resolution. For example, an experienced caller familiar with the call center functions may decide to bypass the initial greetings playback by barging-in in the middle of the greetings with an inquiry. However, the technology for a barge-in function by an automated agent does not currently exist.

SUMMARY

An automated agent system and method includes an action classifier which scores a representation of a portion of a user inquiry based on a knowledge bank. A comparing device compares a running score of the representation to a threshold to determine if enough information has been collected to respond early to the inquiry. An action mechanism provides an early response to the user prior to the user completing the inquiry if the threshold has been exceeded.

A method for responding early to a user inquiry in an automated agent system includes scoring a representation of a portion of a user inquiry based on a knowledge bank, and comparing a running score of the representation to a threshold to determine if enough information has been collected to respond early to the inquiry. A response is made to the user prior to the user completing the inquiry.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Illustrative embodiments of the present disclosure provide systems and methods for barge-in operation by an automated agent to expedite the problem resolution process. In a particularly useful embodiment, when a caller initiates an inquiry, the automated agent keeps recognizing the input speech in conjunction with a knowledge bank and tries to make a reasonable guess regarding the caller's intent. Information in the knowledge bank is updated continuously, either from a call center management team, if they know of prevalent problems, or it could be culled from caller inputs, if a number of special issues dominate the calls.

As soon as the automated agent is confident, it barges in on the caller with a response to the inquiry. Without this type of barge-in method, the process of problem resolution is likely to be slower, making the caller unhappy with the automated call center experience.

The invention described in this disclosure enables barge-in by an automated agent with the help of a knowledge bank to speed up the process of caller's problem resolution. One advantage is that the caller's problem is resolved faster, making the caller satisfied with the call center experience.

It should be understood that the elements shown in the FIGS. may be implemented in various forms of hardware, software or combinations thereof. Preferably, these elements are implemented in a combination of hardware and software on one or more appropriately programmed general-purpose digital computers having a processor and memory and input/output interfaces.

It should be further understood that the use of the word inquiry includes any uttered speech from a user that can evoke a response by the agent system described herein. Inquiry may include a user question, a command, a comment, or a response as the case may be.

Figure 1:
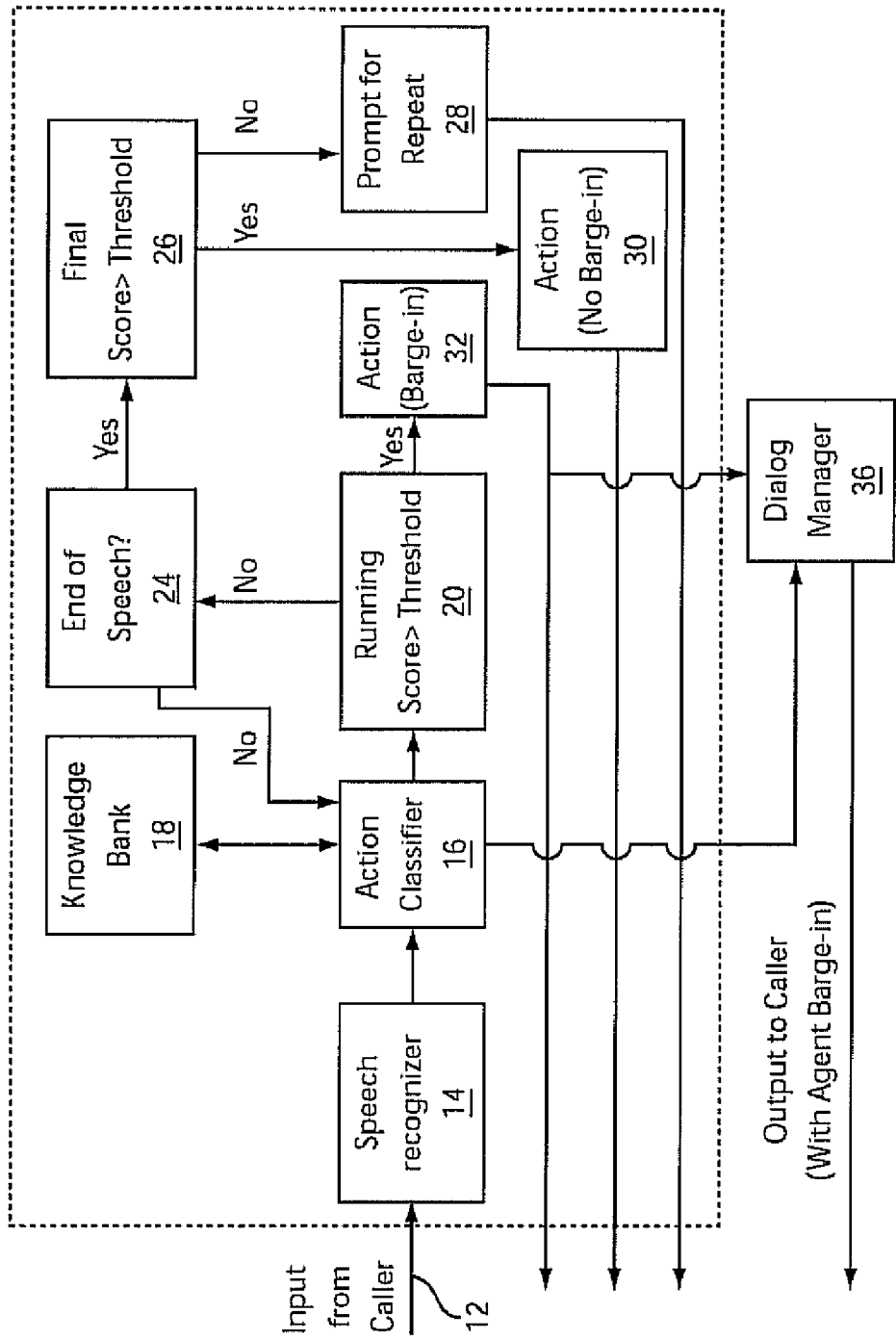
FIG. 1 is a block diagram of an automated agent that expedites responding to user inquiries in accordance with one illustrative embodiment.

Referring now to the drawings in which like numerals represent the same or similar elements and initially to FIG. 1, an automated call center 10 is shown in accordance with an illustrative embodiment. Speech input 12 from a caller is processed by a speech recognizer 14 and an action classifier 16 to determine an action to be taken. The action classifier 16 is aided in its task by a knowledge bank 18, which knows about a domain and a state of the inquiry. The knowledge bank stores information about historically asked questions or responses and may be trained in accordance with the specific application(s) to be performed by agent 10.

Action classifier 16 preferably scores using likelihoods or probabilities that a particular response or inquiry will be posed to agent 10. This calculation or determination may be performed in a plurality of ways. For example, a likelihood that a portion of the response is actually part of a known question is checked and a score is computed. Known algorithms may be employed. An action classifier score is output from the classifier 16 and checked against a threshold in block 20.

In a conventional system this check would be performed only after the end of the entire inquiry. If the final score falls below a preselected confidence threshold, the caller is typically prompted to repeat the query, as the conventional system was unable to make a proper decision. The caller could then repeat the inquiry or make a new one as needed and receive a reply from the automated agent and so on. This suffers from unnecessary delay as described above.

In accordance with embodiments of the present invention, the speech input 12, which is processed by the speech recognizer 14 and the action classifier 16 depends on the knowledge bank 18 to keep track of the domain and state of the inquiry. When an action is taken, the knowledge bank is updated to reflect the latest status of a call and learn new responses.

Rather than waiting until the end of speech is reached, the action classifier score output from classifier 16 is monitored continuously in block 20. When the running score in block 20 exceeds a certain confidence threshold, the automated agent 10 permits a barge-in, even though the caller has not finished speaking the whole inquiry. This includes that when the running score exceeds the threshold, the automated agent 10 has enough information to make a decision and respond to the caller.

As long as the running score is less than the threshold, the system 10 keeps checking to see if the caller has finished speaking. When the end of speech is detected in block 24, the rest of the procedure may follow the paths as described herein. Thus, the final score is compared against a confidence threshold in block 26. If the final score is below this threshold, the caller is prompted to repeat the query in block 28. Otherwise, action is taken in block 30 in a no barge-in mode.

In block 20, when the running score exceeds the threshold, a barge-in action is taken in block 32.

The system 10 permits automated agent barge-in, and the action classifier 16 responds in an appropriate manner in accordance with the system's understanding of the user's inquiry, expediting the problem resolution process.

In an illustrative example, a call center receives a call and the user provides input (12) in the form of an inquiry, for example, "Is tax included in the price of the item?" The speech recognizer 14 would begin recognizing the speech, and when "Is tax" is recognized and input to the action classifier 16 using the knowledge bank 18 would score these two words with a score of say 78%. In this example, the threshold in block 20 is 75%. Therefore, the running score of 78% exceeds the threshold of 75%.

The action of barging-in would be performed in block 32, followed by a response generated by a dialog manager 36 or action classifier 16, which generates an appropriate response. For example, in the present case, the response would be "No, tax is not included in the price".

Figure 2:
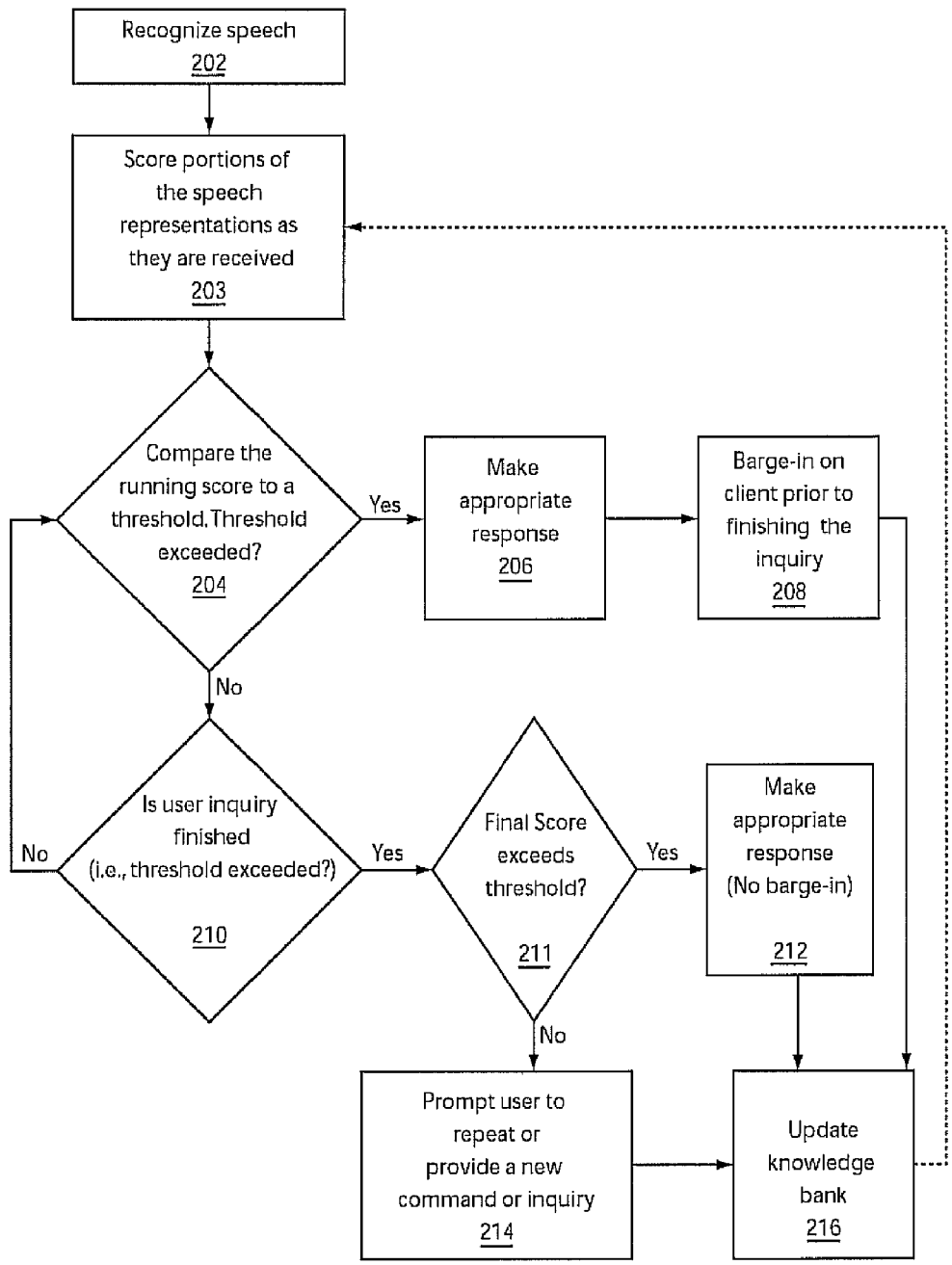
FIG. 2 is a block/flow diagram for an illustrative system/method, which expedites response time to a user inquiry.

Referring to FIG. 2, a block/flow diagram illustratively depicts a system/method for responding early to a user inquiry in an automated agent system in accordance with illustrative embodiments. In block 202, recognizing speech input by a caller in portions as they are received is optionally performed. Text or other input form may be provided instead.

In block 203, the speech representation portions from the user inquiry are scared by the action classifier based on a knowledge bank. The representation preferably includes recognized or decoded speech, as it is being received. Faster decoding improves efficiency of the present invention. The speech is preferably decoded in portions so that an early inference or guess may be made as to the inquiry, response or comment being made by the user.

In block 204, a running score of the representation (portions of the speech) is compared to a threshold to determine if enough information has been collected to respond early to the inquiry. This preferably includes periodically or continuously monitoring the running score to ensure an earliest response to the user's inquiry.

In block 206, if enough information has been received, prior to the user completing the inquiry an appropriate response is made. This may include, e.g., barging in on a user's inquiry prior to its completion, in block 208.

In block 210, when an end of speech for the user's inquiry is detected by conventional means, e.g., by monitoring the speech energy, the final score from the action classifier is compared to a threshold in block 211. This may occur if an earlier barge-in or response cannot be made. Detecting the end of speech includes generating a final action classifier score, which is compared to a final threshold, such that if the final score exceeds the threshold, response is made on the inquiry in block 212 in the no barge-in mode. Otherwise, the user is prompted to repeat the inquiry or give a new command or statement in block 214.

In block 216, the knowledge bank includes information based on a history of previous inquiries, and is updated after an action is taken. Updating the knowledge bank may be employed to increase the response capabilities of the system.

Having described preferred embodiments of a system and method system and method for expedited resolution of inquiries for an automated agent (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. An automated agent system, comprising:
    an action classifier, which scores a representation of a portion of a user inquiry while a user is speaking based on a knowledge bank;
    a comparing device which compares a running score of the scored representation to a threshold to determine if enough information has been collected to respond early to the inquiry;
    an action mechanism which provides an early response to the user prior to the user completing the user inquiry by interrupting the user if the threshold has been exceeded; and
    an end of speech module configured to detect an end of speech of the user and generate a final score, and further configured to compare the final score to a final threshold, such that if the final score exceeds the final threshold action is made on the user's inquiry in a no barge-in mode.

2. The system as recited in claim 1, wherein the knowledge bank includes information based on a history of previous inquiries.

3. The system as recited in claim 1, further comprising a speech recognizer to generate the representation.

4. The system as recited in claim 1, wherein the action mechanism includes a barge-in module, which enables the system to barge-in on the user inquiry prior to its completion.

5. The system as recited in claim 1, further comprising a dialog manager, which responds to the user's inquiry 6. The system as recited in claim 1, wherein the end of speech module generates a final score, which is compared to a final threshold, such that if the final score exceeds the final threshold action is made on the user's inquiry in a no barge-in mode, otherwise the user is prompted to repeat the inquiry.

7. The system as recited in claim 1, wherein the running score is continuously monitored by the comparing device to ensure an earliest response to the user's inquiry 8. An automated call agent system, comprising:
- a speech recognizer, which receives speech information from a user and decodes the speech information into a representation of the speech information while the user is speaking;
- an action classifier, which scores portions of the representation of the speech information based on a knowledge bank;
- a comparing device which compares a running score of the scored portions of the representation to a threshold to determine if enough information has been collected to interrupt the user to respond early to a user inquiry;
- an action mechanism which interrupts the user and provides an early response to the user prior to the user completing the user inquiry, if the threshold has been exceeded; and
- an end of speech module configured to detect an end of speech of the user and generate a final score, and further configured to compare the final score to a final threshold, such that if the final score exceeds the final threshold action is made on the user's inquiry in a no barge-in mode.

9. The system as recited in claim 8, wherein the knowledge bank includes information based on a history of previous inquiries.

10. The system as recited in claim 8, further comprising a dialog manager, which responds the user's inquiry when the action mechanism barges-in.

11. The system as recited in claim 8, wherein the end of speech module generates a final score, which is compared to a final threshold, such that if the final score exceeds the final threshold action is made on the user's inquiry in a no barge-in mode, otherwise the user is prompted to repeat the inquiry.

12. The system as recited in claim 8, wherein the running score is continuously monitored by the comparing device to ensure an earliest response to the user's inquiry.

13. A method for responding early to a user inquiry in an automated agent system, comprising the steps of:
- scoring a representation of a portion of speech information from a user while the user is speaking based on a knowledge bank using a processor;
- comparing a running score of the scored representation to a threshold to determine if enough information has been collected to respond early to a user inquiry; and
- responding to the user prior to the user completing the user inquiry by interrupting the user; and
- detecting an end of speech for the user, including generating a final score, which is compared to a final threshold, such that if the final score exceeds the final threshold action is made on the user's inquiry in a no barge-in mode.

14. The method as recited in claim 13, wherein the knowledge bank includes information based on a history of previous inquiries, and further comprising updating the knowledge bank after an action is taken.

15. The method as recited in claim 13, further comprising recognizing speech to generate the representation.

16. The method as recited in claim 13, wherein responding includes barging in on the user inquiry prior to its completion.

17. The method as recited in claim 13, wherein detecting the end of speech includes generating a final score, which is compared to a final threshold, such that if the final score exceeds the final threshold action is made on the user's inquiry in a no barge-in mode, otherwise the user is prompted to repeat the inquiry.

18. The method as recited in claim 13, wherein comparing includes continuously monitoring the running score to ensure an earliest response to the user's inquiry.

19. A program storage device readable by machine, tangibly embodying a program of instructions executable by the machine to perform method steps for responding early to a user inquiry in an automated agent system, as recited in claim 13.

* * * * *